UNITED STATES PATENT OFFICE.

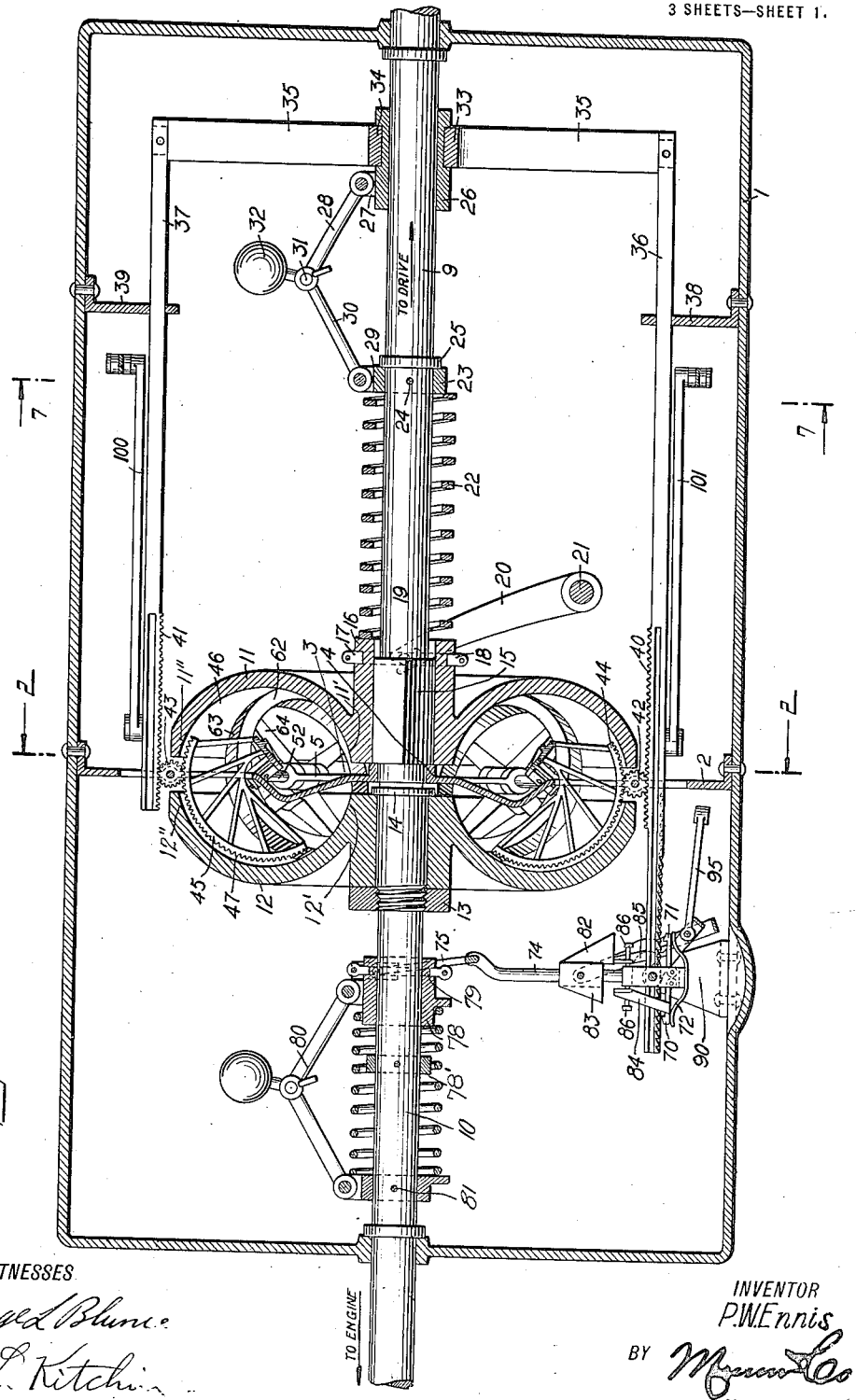

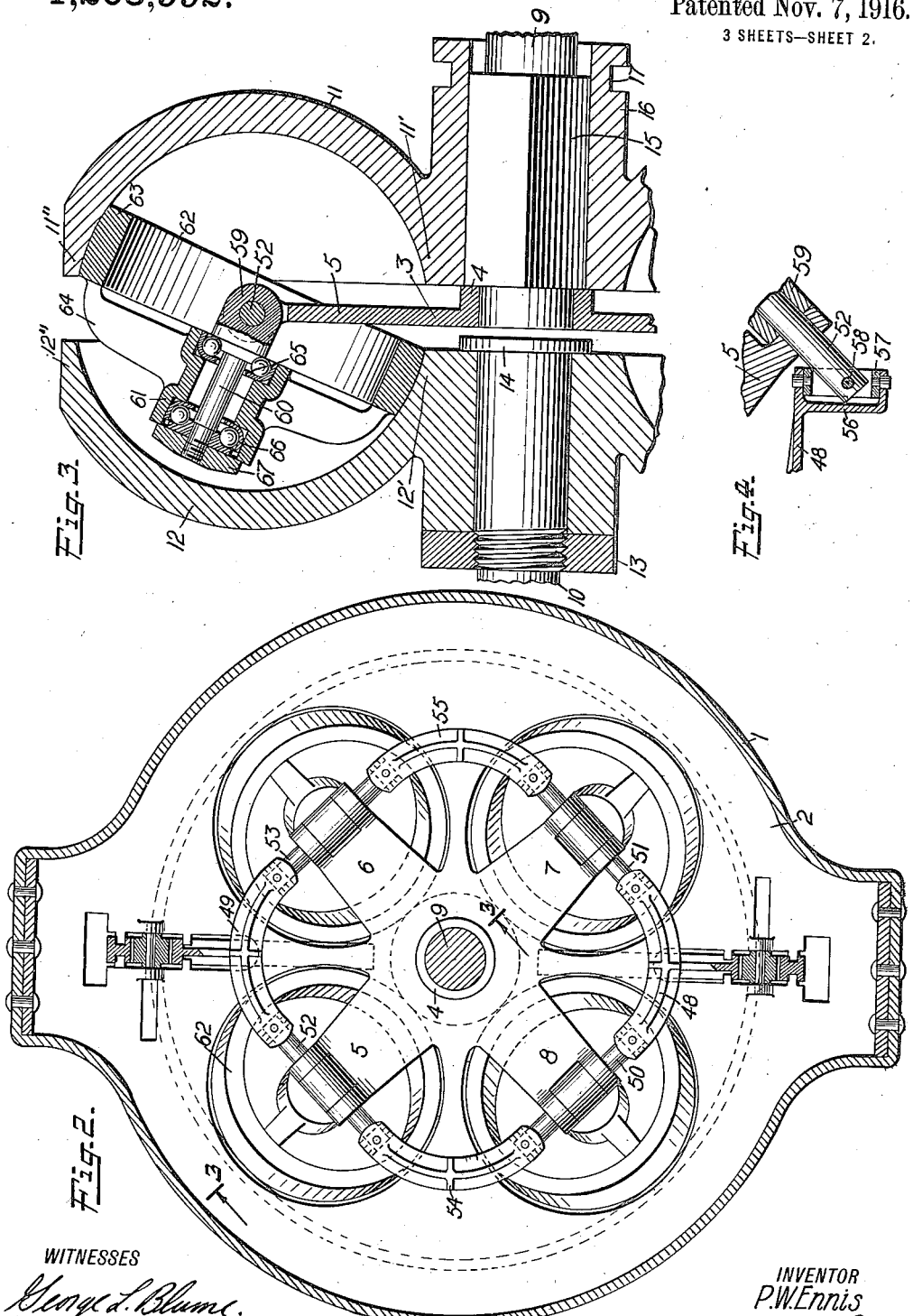
P. W. ENNIS.
TRANSMISSION MECHANISM.
APPLICATION FILED JAN. 20, 1916.
1,203,992.
Patented Nov. 7, 1916.
3 SHEETS—SHEET 2.

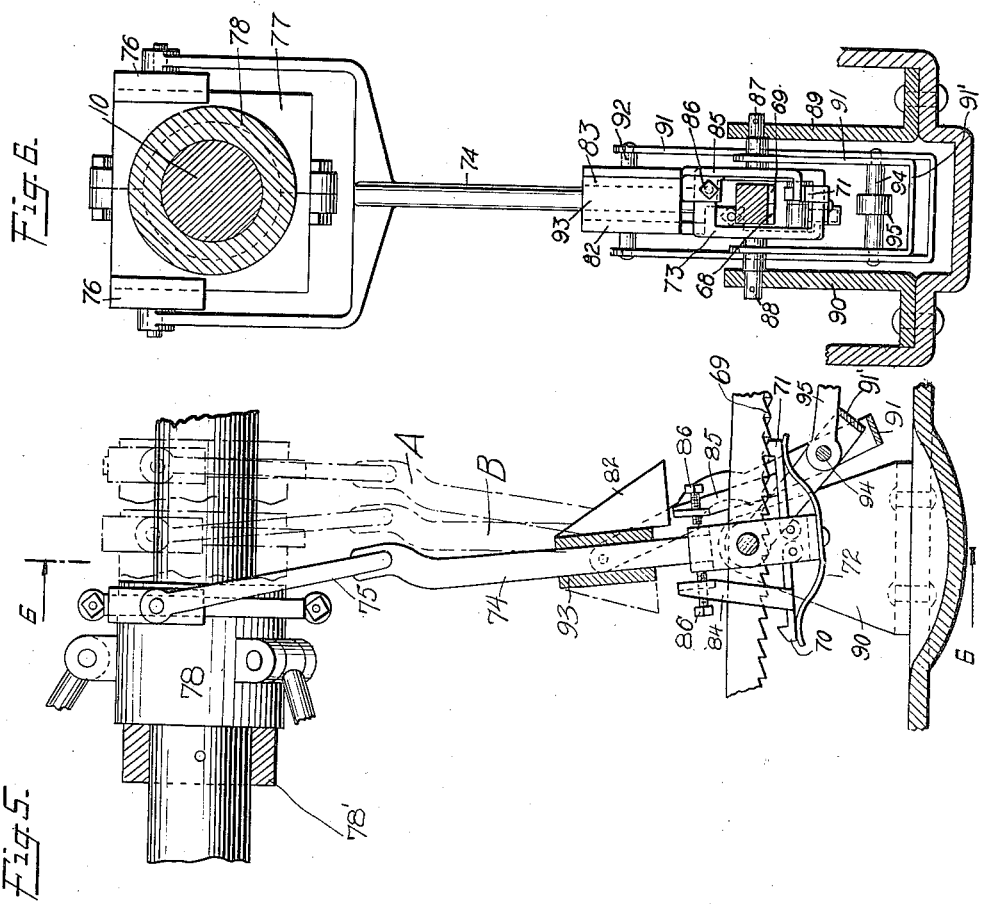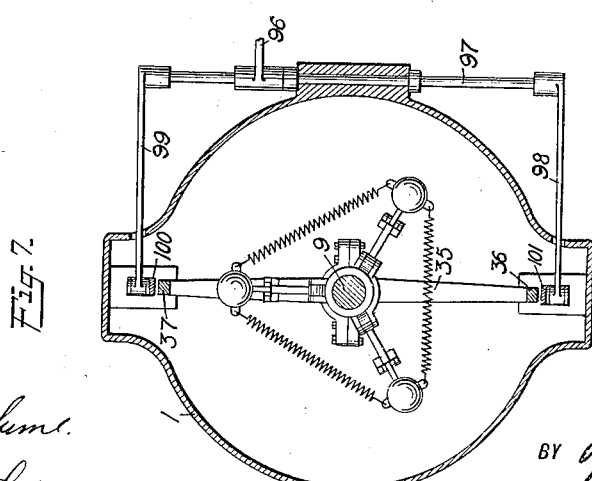

PHILIP WILLIAMS ENNIS, OF FACTORYVILLE, PENNSYLVANIA.

TRANSMISSION MECHANISM.

1,203,992.  Specification of Letters Patent.  Patented Nov. 7, 1916.

Application filed January 20, 1916. Serial No. 73,157.

*To all whom it may concern:*

Be it known that I, PHILIP W. ENNIS, a citizen of the United States, and a resident of Factoryville, in the county of Wyoming and State of Pennsylvania, have invented a new and Improved Transmission Mechanism, of which the following is a full, clear, and exact description.

This invention relates to transmission devices and has for an object the provision of an improved arrangement whereby a driving member may be connected up with a driven member so that any desired speed may be secured.

Another object in view is to provide an improved arrangement of friction drive for transmitting motion from a driving member to a driven member.

A further object in view is to provide a friction drive between a driving and driven part and means connected with the friction transmission and the driven member whereby the transmission will be automatically shifted according to the load thrown on the driven member so that the driving member may always operate at a given speed and the driven member at different speeds.

A still further object in view is to provide a friction transmission in connection with a driving member and driven member, together with means for automatically shifting the transmission according to the load of the driven member, this means operating in connection with manually and semi-manually controlled means for varying the automatic action just mentioned.

In the accompanying drawings: Figure 1 is a longitudinal vertical section through a device embodying the invention. Fig. 2 is a section through Fig. 1 on line 2—2, the same being shown on an enlarged scale. Fig. 3 is a fragmentary sectional view through Fig. 2 on line 3—3, the same being on an enlarged scale. Fig. 4 is a detail fragmentary sectional view through one of the universal connections shown in Fig. 2. Fig. 5 is a side view on an enlarged scale of the control for the automatic shifting means. Fig. 6 is a section through Fig. 5 approximately on line 6—6. Fig. 7 is a transverse sectional view through the structure shown in Fig. 1, the same being on line 7—7 but on a reduced scale.

Referring to the accompanying drawings by numerals, 1 indicates a casing which may be of any desired kind and which is provided with a division plate 2 held in place by any suitable means, as for instance, rivets, said division plate having a central part which forms a spider 3, said spider having a hub 4 and arms 5, 6, 7 and 8, as shown in Fig. 2. The hub 4 rests upon the end of the driven shaft 9, as shown in Fig. 1. This spider is intended to remain stationary with the casing and to support certain members hereinafter fully described. Arranged in line with the driven shaft 9 is a driving shaft 10 connected with the engine or other suitable motive power, the shafts 9 and 10 extending through the casing to any desired distance.

Rigidly connected with the shaft 9 is a friction plate 11, while a friction plate 12 is rigidly connected with shaft 10. The plate 12 is connected by a key or in any other suitable manner so that the same must rotate with the engine, while a locking nut or other means 13 is provided for preventing any longitudinal motion of the plate in one direction while a stop 14 is provided for preventing any longitudinal movement in the opposite direction. However, in respect to the friction plate 11 the same is mounted upon a squared section 15 so as to freely reciprocate on the shaft 9 while rotating therewith. In order to provide a proper bearing so that the plate 11 may move back and forth easily, said plate is provided with a hub 16 having a groove 17 designed to have a friction ring 18 arranged therein, said ring having suitable pins 19 designed to be engaged by the bifurcated lever 20 whereby when the lever 20 is swung by the rocking shaft 21 the hub 16, together with plate 11, may be moved back and forth as desired while the plate is standing still or while the same is rotating.

A spring 22 surrounds shaft 9 and bears against the hub 16 and against a ring 23, said ring being held in place by a rivet or pin 24 and also by a rigid stop 25. By this means the spring 22 is arranged to continually resiliently hold the plate 11 in substantially the position shown in Fig. 1, though the plate may be moved against the action of the spring by operating shaft 21. A sleeve 26 is slidably mounted on shaft 9 adjacent the stop 25, as shown in Fig. 1, said sleeve having an ear 27 for engaging one link 28, while the ring 23 has an ear 29 for receiving the link 30. Links 28 and 30 are pivotally connected to ears 27 and 29 and are pivotally connected together at 31. The pivotal connection 31 is connected with a ball 32 whereby the construction is that of a governor and as the ring 23 is rotated the governor will be rotated so as to move the sleeve 26 back and forth according to the speed of shaft 29. A ring 33 surrounds the sleeve 26 and fits into an annular recess 34 so that the same may be moved back and forth with the sleeve.

The ring 33 merges into a plurality of arms 35, which arms are connected to the racks 36 and 37, said racks being guided by brackets 38 and 39 secured to casing 1. The teeth 40 and 41 of the respective racks are arranged to engage the pinions 42 and 43 respectively, as shown in Fig. 1. These pinions engage the segmental racks 44 and 45, respectively, arranged between the friction plates 11 and 12. In connection with the friction plates it will be seen that they are provided with concave portions 46 and 47 which, when arranged adjacent, as shown in Fig. 1, and cut in half, resemble a circular bore in cross section. In the drawings there are shown only two segmental racks 44 and 45 but a greater or even a less number may be used if desired, though two ordinarily are preferable. These segmental racks are rigidly connected to or formed integral with bars 48 and 49 (Fig. 2). Bar 48 is connected to shafts 50 and 51 while bar 49 is connected with shafts 52 and 53. Bar 54 connects shafts 50 and 52, while bar 55 connects shafts 51 and 53. These bars as well as bars 48 and 49 are pivotally connected with the various shafts just mentioned by universal connections, as shown in detail in Fig. 4, wherein it will be seen that the bar 48 is provided with a socket 56 in which is pivotally mounted a ring 57. The shaft 52 has a pin 58 extending therethrough and into the ring 57, said pin extending at right angles to the pivotal mounting of the ring 57 whereby a universal connection is produced. By this construction and arrangement when the segmental racks 44 and 45 are moved the various shafts 50 to 53 will be rotated. These shafts carry friction wheels, as shown in detail in Fig. 3. The angle of the friction wheels carried by these shafts determines the ratio of speed between the driving shaft 10 and the driven shaft 9 and, consequently, the ratio of drive. A description of shaft 52 and associated parts will clearly explain the construction of this phase of the invention and as the remaining shafts, wheels and associated parts are identical therewith no further description will be made.

Referring particularly to Fig. 3 it will be seen that shaft 52 is mounted on an enlargement of the arm 5 of the spider 3. The shaft 52 extends through the enlargement 59 of an auxiliary shaft 60. The auxiliary shaft 60 extends through the hub 61 of the wheel 62, said hub being connected with the rim 63 by a plurality of spokes 64 arranged so that the hub will be positioned on one side of the rim. In order that the friction may be reduced to a minimum antifriction members 65 and 66 and associated parts are provided, the same being in the nature of ordinary ball bearings, the same being held together by a suitable nut 67. By setting the hub of the wheel to one side of the rim the enlargement of arm 5 may be extended to the center of the rim and thereby allow the wheel to be turned properly from its central point so as to engage the friction plates 11 and 12 at any point between ends 11' and 11" and also 12' and 12", respectively. When the rim 63 is engaging the end 12' and end 11", as shown in Fig. 3, the transmission is at its lowest point; namely, the engine is running at a high speed while the driven shaft is running at a low speed. This arrangement of the parts will take place when the automobile on which the device is mounted is climbing a very steep hill or in case the device is used on some other machinery it would take place when there is a heavy load thrown thereon. This arrangement gives the engine its maximum pulling power by gearing down the driven shaft with the driving shaft.

By arranging the segmental racks 44 and 45 and associated parts as described, the wheel 62 may be shifted at any time, said shifting being done easiest when the machine is in motion. Also, by the arrangement of the ball 32 and associated parts forming the governor and the connection thereto through the pinions 42 and 43, the various friction wheels may be shifted automatically, as the driven shaft begins to decrease in speed by reason of the extra load thrown thereon. The reverse is also true, namely, when a heavy load is taken off and the driven shaft begins to speed up as there is less resistance to the power applied thereto, the parts will move in an opposite direction so that the driving shaft may always rotate at the same speed while the driven shaft may rotate at different speeds.

As shown in Fig. 1, 5 and 6, means are provided for causing the automatic shifting of the friction wheels and for certain other actions hereinafter fully described. Referring more particularly to these figures 68 and 69 are oppositely arranged ratchet teeth on the extreme end of the bar 36. The ratchet teeth 69 are intended to coact with pawl 70 while ratchet teeth 68 coact with pawl 71, both of these pawls being pressed by a spring 72 connected to a frame 73. The frame 73 is rigidly connected to a rod 74 which in turn has a bifurcated member 75 arranged on the outer or upper end, which bifurcated member is pivotally mounted on slides 76, said slides being slidingly mounted upon a squared enlargement 77 of sleeve 78. The sleeve 78 is slidingly mounted on shaft 10 but rotates therewith, while the enlargement or guide 77 is rotatably mounted in a groove 79 formed in the sleeve 78. The sleeve 78 forms part of a governor 80, which governor is connected by a pin 81 or other suitable means, to shaft 10, as more clearly shown in Fig. 1. As shaft 10 rotates the governor 80 will automatically move to the proper position according to the speed of the shaft and in moving will swing the bar 74 as shown in Fig. 5. The swinging movement of the bar 74 is limited in one direction by the collar 78' and limited in the opposite direction by the length of the links 80. As the lugs 82 and 83 are slidingly mounted on the bar 74 and are arranged a short distance above the posts 84 and 85, they will be always in position for engaging said posts and causing the disengagement of the pawls 70 and 71, whenever link 95 is moved manually until the pin 94 is in alinement with bar 74. This will allow the manual disengagement of pawls 70 and 71 at any time, as the link 95 may be moved at any time, causing the lugs 82 and 83 to depress posts 84 and 85. It is of course understood that the stop 78' is secured in position in any suitable manner and is placed at a proper position on shaft 10 to allow a sufficient movement of bar 74, whereby pawl 71 may engage its rack bar.

As shown in full lines in Fig. 5, the lug 82 will engage post 85 and move the same downwardly, thereby swinging pawl 71 out of engagement with the ratchet teeth 68, as post 85 is rigidly connected with pawl 71. A set screw 86 is provided on post 85 so as to cause the pawl to remain out of engagement with the teeth 68 until the bar 74 and associated parts have moved to the dotted position A (Fig. 5). When arranged in the dotted position B in Fig. 5 both pawls are disengaged, as shown more clearly in Fig. 1, while when the parts are arranged as shown in dotted lines in Fig. 5 pawl 71 is engaged and pawl 70 disengaged. The pawls 70 and 71 are pivotally mounted at the lower part of frame 73 and would, by reason of spring 72, continually engage the ratchet wheels except for the posts 84 and 85 and the lugs 82 and 83.

In order to provide for a manual control of the pawls 70 and 71 a U-shaped member 91' has the ends thereof pivotally mounted on shafts 87 and 88, which shafts are rigidly connected to the frame 73 and extend through uprights or brackets 89 and 90, as shown more particularly in Fig. 6. A second U-shaped member 91 is pivotally mounted at 92 to the sleeve 93 to which lugs 82 and 83 are secured. The lugs 82 and 83 are rigidly secured to or formed integral with the sliding sleeve 93, which sleeve surrounds member 74 and which is moved up and down thereon by the U-shaped member 91. Near the opposite end to the pivotal mounting 92 a shaft 94 extends through the U-shaped members 91 and 91' so as to pivotally connect these members together. A rod 95 is connected with shaft 84, said rod being designed to be connected with a hand or foot operated lever, whereby whenever desired rod 95 may be moved back and forth so as to bring the U-shaped members 91' and 91 into alinement with bar 74, whereupon lugs 82 and 83 will be moved out of the way. When this has occurred the manually actuated lever 96 (Fig. 7) may be operated so as to move the rock shaft 97. As rock shaft 97 is moved the arms 98 and 99 are swung, whereby the links 100 and 101 will be moved back and forth according to the movement of the lever 96. As the pawls 70 and 71 are held out of engagement with their respective ratchet teeth the members 36 and 37 may be moved back and forth as desired against the action of the governor formed by ball 32 and associated parts, so as to hold the friction wheel in any desired position. This can be done only when the bar 74 and associated parts are substantially in the position shown in Fig. 1 or the dotted position B shown in Fig. 5. When the parts are in the position shown in Fig. 1 it will be observed that the set screws 86 on the posts 84 and 85 will hold the pawls out of engagement, whereby the governor formed by ball 32 and associated parts may freely control the movement of members 36 and 37 and, consequently, the position of the friction wheels.

When the parts are in the position shown in full lines in Fig. 5, members 36 and 37 may move in one direction, namely, so that the slide 26 may be moved nearer plate 11, but cannot move in a reverse direction by reason of pawl 71. The reverse is true when the parts are in the dotted position A in Fig. 5. When the parts are in what may be termed a neutral position, as shown in Fig. 1, the members 36 and 37 and associated parts may move back and forth as desired so that the ratio of speed may be automatically changed according to the resistance of the driven shaft 9. It will be noted that by operating lever 96 (Fig. 7) the links 100 and 101 (Fig. 1) may be actuated and as these links are pivotally connected with members 36 and 37 the pinions 42 and 43 and associated parts may be actuated in either direction according to the actuation of lever 96 provided pawls 70 and 71 are disengaged. If one of these pawls is engaged the manual operation may be made in one direction only. However, if it is desired to manually operate these members in a direction opposite that permitted by the pawls, these pawls may be thrown out of engagement by manually operating the link 95 and U-members 91 and 91', respectively, and associated parts, thus allowing the device to be manually operated whenever desired. Ordinarily, the device is not manually adjusted, as such manual adjustment will either cause the engine to race or cause an excessive load to be placed on the engine, so that this provision of the invention is to be used only in exceptional cases.

Where an engine runs at a certain speed most efficiently the parts are so adjusted that the engine may drive the shaft 10 at the efficient speed mentioned and the power communicated therefrom to the driven shaft 9. Of course this may limit the speed of an automobile below that which it is actually capable of making. If it should be desired to secure the utmost speed possible the manually operated members are then brought into play and the speed is secured at the expense of abusing the engine. When the automatic device is being utilized the shaft 10 will always run at the same speed whether the automobile is moving up hill, down hill or on a level, but the shaft 9 will move at different speeds. The changing of speed of the shaft 9 is done automatically while shifting the friction wheels. It is of course evident that when going down a hill of considerable length the engine may be throttled down in the usual way, or plate 11 released by the actuation of lever 20 against the action of spring 22 and the engine temporarily stopped in the usual manner.

What I claim is:—

1. In a friction drive mechanism of the character described, a pair of friction plates, a driving member for moving one of said plates, a driven member connected to the other of said plates, a wheel arranged between said plates and contacting with both of the plates, means for shifting the position of said wheel so as to vary the ratio of drive, and a controlling member connected with said means for moving said means according to the resistance applied to the driven member, whereby the driven member may operate at different speeds while the driving means will operate continually at the same speed.

2. In a friction drive mechanism of the character described, a pair of friction plates, both of said plates being provided with a concave contacting face, said contacting faces facing each other, a friction wheel arranged between said plates and in engagement with both of said faces, said friction wheel being adapted to be rotated on its axis so as to vary the transmission from one plate to the other, automatic means for shifting the position of said friction wheel, a driven member connected with one of said plates and with the automatic means, and a driving member connected with the other of said plates.

3. In a friction drive mechanism of the character described, a pair of friction plates, each of said plates having a convex annular friction surface, said friction surfaces facing each other, a friction wheel arranged between said surfaces and engaging both surfaces, said friction wheel being adapted to be adjusted so as to contact with the hub portion of the surface of one of the plates and the peripheral portion of the other of said plates, means for adjusting the friction wheel so as to move the same from contact with the peripheral surface of the last mentioned plate to any point between said peripheral point and the hub so as to change the ratio of speed, a driven member connected with one of said plates, a driving member connected with the other of said plates, and means connected with the driven member for automatically shifting said friction wheel.

4. In a friction drive mechanism of the character described, a driving member, a friction plate connected with said driving member, said friction plate having a convex annular surface, a driven member, a friction plate connected with said driven member provided with a convex annular surface, a friction wheel arranged between said plates and engaging both of said surfaces, means connected with said wheel for adjusting the same so that the wheel may engage said surfaces at any point from the hub section to the peripheral section and thereby vary the ratio of drive, an automatic member connected with said means and with the driven member for shifting the wheel according to the ratio of the driven member, and a manually operated member connected with said means whereby the wheel may be shifted manually.

5. In a friction drive mechanism of the character described, a driving member, a friction plate connected with said driving member, said friction plate having a concave annular surface, a driven member, a friction plate connected with said driven member so as to rotate therewith but capable of movement toward and from the first mentioned friction plate, said last mentioned friction plate having a concave annular friction surface, a friction wheel arranged between said plates and adapted to engage said surface, means for shifting the position of said friction wheel so as to vary the speed of transmission between the plates, and a resilient member engaging the slidably mounted plate for pressing the same against said friction wheel.

6. In a friction drive mechanism of the character described, a driving shaft, a friction plate connected with said driving shaft provided with a concave annular surface, a driven shaft, a friction plate connected with said driven shaft and provided with a concave annular surface, a plurality of friction wheels arranged between said plates and contacting with said surfaces, a stationary spider for supporting said wheels, a rack connected to one of said wheels, a pinion connected with said rack, means for rotating said pinion whereby the rack will be operated and the wheel connected therewith will be shifted, and means for connecting said last mentioned wheel with the remaining friction wheels so that all of the friction wheels will be shifted simultaneously and at the same degree.

7. In a friction drive mechanism of the character described, a driving shaft, a friction plate provided with a concave surface, said friction plate being rigidly connected with said driving shaft, a second friction plate formed with a concave annular surface, a driven shaft connected with said second friction plate, a plurality of friction wheels arranged between said plates and engaging the friction surfaces thereof, a stationary spider arranged between said plates, a shaft for each of said friction wheels journaled on the arms of said spider, a flexible connecting member for connecting all of said friction wheels together so that when one wheel is shifted all of the wheels will be shifted in the same direction and the same distance, a pair of segmental racks connected with said flexible connecting members, a pinion meshing with each of said racks, a reciprocating rack meshing with each of said pinions, and a governor connected with said driven shaft and with said sliding racks for shifting the same and consequently for moving the friction wheels for varying the ratio of drive according to the load on the driven shaft.

8. In a friction drive mechanism of the character described, a driving shaft, a friction plate connected with said driving shaft, said friction plate being formed with a concave annular surface, a driven shaft, a friction plate connected with said driven shaft, said last mentioned friction plate being formed with a concave annular surface, a plurality of friction wheels arranged between said plates and engaging said friction surfaces, a pair of reciprocating members, means for transmitting the reciprocating motion of said members to said wheels for shifting the position thereof for changing the ratio of drive, a sliding sleeve arranged on said driven shaft, means for connecting said reciprocating members with said sleeve, and a governor connected with said sleeve and with said shaft whereby as the speed of the shaft varies the governor will move said sleeve back and forth and consequently will move the reciprocating members back and forth, thus shifting said friction wheels and changing the ratio of drive according to the speed of the driven shaft.

9. In a friction drive mechanism of the character described, a driving shaft, a friction plate connected with said driving shaft, a driven shaft, a friction plate connected with said driven shaft, a friction wheel arranged between said plates for transmitting power from one plate to the other, means for varying the position of said wheel for changing the ratio of transmission, said means including a reciprocating member, a governor connected with said driving shaft, said governor being formed with a slide adapted to be moved back and forth according to the speed of the driving member, a pivotally mounted arm loosely connected with said slide and adapted to be moved pivotally according to the sliding movement of said sleeve, and means controlled by said pivotally mounted arm for limiting the movement of the means for varying the position of the friction wheels whereby said friction wheels may be adjusted in one direction only.

10. In a friction drive mechanism of the character described, a driving shaft, a friction plate connected with said driving shaft, a driven shaft, a friction plate connected with said driven shaft, a plurality of friction wheels arranged between said plates and contacting therewith, means for shifting the position of said wheels so as to change the ratio of drive between the plates, said means including a reciprocating rack member having two sets of teeth, one set facing in the opposite direction to the other, a governor connected with said driving shaft, said governor having a sliding sleeve, a pivotally mounted bar connected with the sleeve so as to be swung back and forth according to the movement of the sleeve, a pair of oppositely facing hooks mounted on said bar and adapted to engage the teeth of said racks, means for holding said hooks out of engagement when the driving shaft is running at a predetermined speed, said means being thrown out of operation when said pivotally mounted bar is swung from its normal position so that one of the hooks will be disengaged and thereby cause the means for adjusting the friction wheels to move only in one direction.

In testimony whereof I have signed my name to this specification in the presence of two subscribing witnesses.

PHILIP WILLIAMS ENNIS.

Witnesses:
E. S. HINDS,
H. T. WOLFE.